US011677556B2

(12) United States Patent
Boneh et al.

(10) Patent No.: US 11,677,556 B2
(45) Date of Patent: *Jun. 13, 2023

(54) CONSENSUS LAYER ARCHITECTURE FOR MAINTAINING SECURITY WITH REDUCED PROCESSING POWER DEPENDENCY IN UNTRUSTED DECENTRALIZED COMPUTING PLATFORMS

(71) Applicant: Chia Network Inc., San Francisco, CA (US)

(72) Inventors: Dan Boneh, San Francisco, CA (US); Krzysztof Pietrzak, San Francisco, CA (US); Bram Cohen, San Francisco, CA (US); Lipa Long, San Francisco, CA (US); Richard Kiss, San Francisco, CA (US); Alex Wice, Toronto (CA); Mariano Sorgente, San Francisco, CA (US); Benedikt Bunz, Palo Alto, CA (US); Ben Fisch, San Francisco, CA (US)

(73) Assignee: Chia Network Inc., San Francisco, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/494,198

(22) Filed: Oct. 5, 2021

(65) Prior Publication Data

US 2022/0045860 A1    Feb. 10, 2022

Related U.S. Application Data

(63) Continuation of application No. 17/489,480, filed on Sep. 29, 2021, which is a continuation of application
(Continued)

(51) Int. Cl.
H04L 29/06    (2006.01)
H04L 9/32    (2006.01)
H04L 9/00    (2022.01)

(52) U.S. Cl.
CPC .......... *H04L 9/3218* (2013.01); *H04L 9/3239* (2013.01); *H04L 9/50* (2022.05); *H04L 2209/56* (2013.01)

(58) Field of Classification Search
None
See application file for complete search history.

(56) References Cited

U.S. PATENT DOCUMENTS

2016/0292672 A1* 10/2016 Fay .................... G06Q 20/3829
2017/0005804 A1* 1/2017 Zinder .................. H04L 63/123
(Continued)

*Primary Examiner* — Maung T Lwin
(74) *Attorney, Agent, or Firm* — Run8 Patent Group, LLC; Peter Miller; Brian T. Chew

(57) ABSTRACT

Disclosed are aspects of an untrusted decentralized computing platform that includes an untrusted decentralized database which participant computing systems within the platform reach consensus on an accepted representation thereof. Some aspects of the databased include one or more directed acyclic graphs, which may include cryptographic hash pointers. Some aspects include an untrusted decentralized database architecture that includes two constituent chains. Some aspects of a consensus layer of the untrusted decentralized computing platform alternate a proof of space with a verifiable delay function to reduce compute resource waste relative to systems reliant on compute sources for proofs of work. In some aspects of a consensus layer alternating the proof-of-space and the proof-of-time, a single difficulty factors may be determined by multiplying their difficulty factors together to generate a single variable which accounts for difficulty for both proofs.

20 Claims, 4 Drawing Sheets

Related U.S. Application Data

No. 15/931,463, filed on May 13, 2020, now Pat. No. 11,165,582.

(60) Provisional application No. 62/850,221, filed on May 20, 2019.

(56) References Cited

U.S. PATENT DOCUMENTS

| | | | |
|---|---|---|---|
| 2017/0337534 A1* | 11/2017 | Goeringer | H04L 63/12 |
| 2017/0372278 A1* | 12/2017 | Frolov | H04L 9/50 |
| 2019/0349185 A1* | 11/2019 | Kim | H04L 9/0637 |

* cited by examiner

CONSENSUS LAYER ARCHITECTURE FOR MAINTAINING SECURITY WITH REDUCED PROCESSING POWER DEPENDENCY IN UNTRUSTED DECENTRALIZED COMPUTING PLATFORMS

CROSS-REFERENCE TO RELATED APPLICATIONS

This application is a continuation application of U.S. patent application Ser. No. 17/489,480, filed on 29 Sep. 2021, which is a continuation application of U.S. patent application Ser. No. 15/931,463, filed on 13 May 2020, which claims the benefit of U.S. Provisional Application 62/850,221, filed on 20 May 2019, each of which is incorporated in its entirety by this reference.

BACKGROUND

1. Field

The present disclosure relates to optimizations in decentralized computer systems and, more particularly, a consensus layer architecture for a blockchain-based decentralized database that alternates a proof of space and verifiable delay function to reduce compute resource waste relative to proof of work dependent consensus while maintaining high security values.

2. Description of the Related Art

Decentralized computing platforms are broadly applicable in a variety of different contexts. A canonical use case is management of a digital bearer asset or, more generally, rendering digital assets rivalrous, like cryptocurrency, utility tokens, and the like, often with no central point of control. Like physical currencies and commodities, some digital assets may exhibit similar properties including having an associated value and fungibility (or the absence of fungibility, like with ERC721 tokens). In many cases, decentralized computing platform can allow for transactions and borderless transfer-of-ownership of assets between participants. These properties provide liquidity to those who live in countries with poorly run or destabilized central currencies and offer a universal exchange for streamlined transfers. Other example contexts for decentralized computing platforms include storage or processing of digital assets, like digital files and other data, and incentives for storage or processing of those assets may be real or digital currency or some other asset (e.g., compute time in exchange for storage or vice versa).

SUMMARY

The following is a non-exhaustive listing of some aspects of the present techniques. These and other aspects are described in the following disclosure.

Some aspects include a technique for implementing an untrusted decentralized computing platform that includes an untrusted decentralized database which participant computing systems within the platform reach consensus on the accepted representation thereof. Some aspects of the untrusted decentralized computing platform manage a cryptographic currency. Some aspects of the untrusted decentralized database store information about the generation of digital assets for the cryptographic currency and transactions pertaining to ownership and exchange of those digital assets. Some aspects of the databased include one or more directed acyclic graphs, which may include cryptographic hash pointers. In some aspects the untrusted decentralized database is a blockchain-based database.

Some aspects of a consensus layer of the untrusted decentralized computing platform alternate a proof of space with a verifiable delay function to reduce compute resource waste relative to systems reliant on compute sources for proofs of work. Aspects of a proof of space may utilize less compute resources than generation of a proof of work. In some aspects the alternation of the proof of space with a verifiable delay function (VDF) maintains high security values by extending a blockchain with a block based on a proof of space dependent at least in part on a prior VDF output of a previous block and a VDF output dependent at least in part on a prior proof of space or prior block having a proof of space.

Some aspects combine proofs of space and verifiable delay functions to create a distributed cryptocurrency which is secure and which does not have the waste of a proof-of-work based cryptocurrency but which maintains safeguards against an attack surface that is relatively open compared to proof of work based systems. The combination of proofs of space and verifiable delay functions according to the techniques described herein may mitigate digging attacks and long range attacks. Aspects of a VDF may include a sequential function which takes a prescribed number of steps to compute, which cannot be parallelized, and whose output can be easily and publicly verified. The consensus layer may specify a protocol for block generation and verification that alternates between proofs of space and VDFs and which honest parties verify to reach consensus on the representation of the information stored within the untrusted database.

In some aspects a blockchain implemented by the untrusted distributed computing platform includes two constituent chains. A trunk chain contains the proofs of space and the VDF, and a foliage chain, contains the transactions, timestamps, and a signature binding the foliage to the trunk. While the foliage is susceptible to grinding attacks, grinding attacks against the trunk are substantially mitigated. The consensus layer protocol may specify generation of a challenge for creating the next block where the challenge is based on the output of the VDF output of the prior block. Because the VDF is contained within the un-grindable trunk, and because aspects utilize cryptographic primitives in the trunk are unique, adversarial parties are unable to alter the challenge by varying payload data.

In some aspects of a consensus layer alternating the proof-of-space and the proof-of-time, a single difficulty factors may be determined by multiplying their difficulty factors together to generate a single variable which accounts for difficulty for both proofs. Challenges for proofs of space and VDFs may be generated from the single difficulty factor and the product of both challenges may have a criteria of meet this threshold, which participants may enforce. Some aspects recalculate the difficulty factor after a first number of blocks are generated. Some embodiments of the consensus layer enforce a recalculated difficulty factor after the number of blocks are generated and after a delay by a second number of blocks, such as a fraction of the first number of blocks.

Some aspects of a decentralized computing system may include a consensus layer that incentivizes the creation and tracking of multiple potential chains in a blockchain. Aspects of the consensus layer may include a protocol specifying the computation of proofs for multiple blocks at each depth of a blockchain and then tracking those resulting multiple chains to mitigate an attack surface for double dipping threats based on the percentage of space (e.g., storage space) honest farming participants control.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
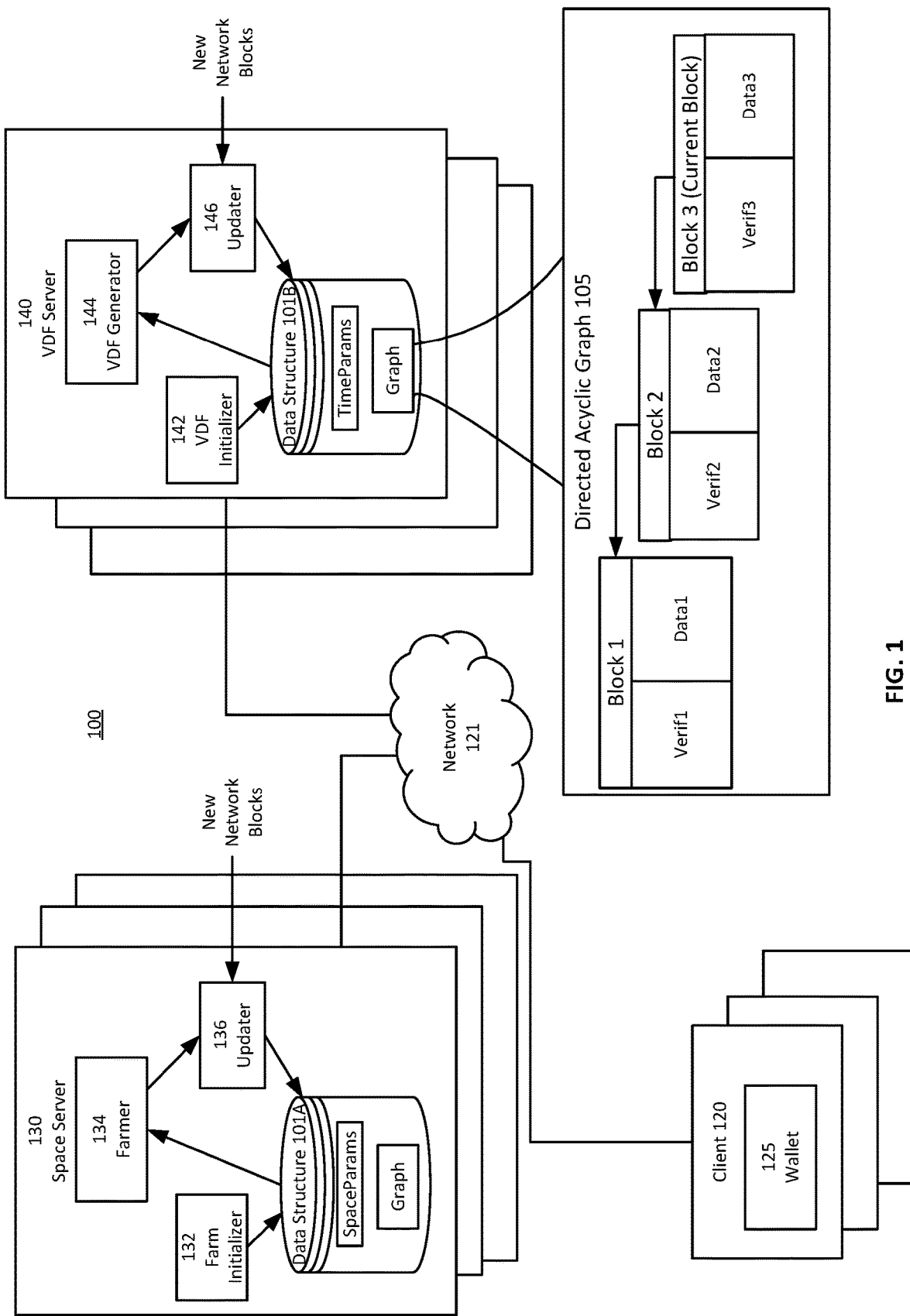
FIG. 1 illustrates an example computing environment of a decentralized computing platform with a consensus layer architecture configured to maintain security values in an untrusted decentralized database with reduced dependency on compute power, according to an example embodiment.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of decentralized computing, cryptography, and cybersecurity. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Decentralized computing platforms for management of digital assets have proved themselves to be robust in principle and robust in practice when healthy. Health of a decentralized computing platform in practice, however, is too often reliant on external factors. Digital currencies, for example, are created via consensus, a mechanism that is used in decentralized computing platforms to achieve agreement on a single data value or result among the distributed processes or systems of the platform. Typically, this consensus is reached by solving equations known as proofs of work that rely heavily on computing power. Several significant issues arise out of the reliance on significant and ever-increasing amounts of computing power.

First, decentralized computing platforms reliant on proofs of work are becoming more and more centralized rather than more decentralized due to the economics of input costs for contributing a giving amount of compute power. For example, considering a relatively similar cost of hardware for computing proofs of work problems across different locales, decentralized computing platform participants that provide backbone execution of proofs of work physically locate that hardware responsive to operational input costs like electricity and real estate to maximize profit from rewards for executing those proofs. Consequently, the number of participants in an economically viable position to generate proofs of work is greatly reduced even as the overall number of participants may increase. At the same time, those remaining participants still generating proofs of work are forming pools, which further acts to bring a sort of centralization to a computing platform that purports to be decentralized (and for which decentralization of compute power (or some other securing commodity) is often necessary for security).

Second, assuming a decentralized computing platform remains relatively decentralized, e.g., at least enough to remain secure within its design and therefore trusted, those proofs of work still push participants into an arms race to attain greater amounts of compute power to reap rewards with greater frequency. As outlined above, compute power is not free, input resources like real estate and electricity as well as materials for new and more efficient hardware are all real-world commodities consumed by participants in the interest of maintaining a percentage of the total compute power within the platform. The design of decentralized computing platforms reliant on compute power intensive proofs of work all but guarantee such an arms race and result in significant wastes of energy, materials, and physical space for compute systems. (None of which is to suggest that any technique is disclaimed here or with the discussion of any other tradeoff discussed herein.)

Some embodiments implement a decentralized computing platform that mitigates some of the challenges with existing decentralized computing platform and especially those arising from excessive waste surrounding compute resources in decentralized computing platforms reliant on proofs of work. Moreover, embodiments implement a decentralized computing platform that mitigates challenges with existing decentralized computing platform not reliant on proofs of work and especially those related to maintaining high security values not inherently afforded to those other platforms not reliant on proofs of work.

A common example of a decentralized computing platform reliant on proof of work is Bitcoin, although many others exist and face similar shortcomings. While specific metrics and shortcomings are discussed relative to Bitcoin herein, similar metrics and shortcomings apply to other proofs of work reliant platforms. Generally, these platforms may be referred to as having a blockchain-based format for which generating of a block of the chain to receive a block generating rewards requires a proof of work. Currently, with few exceptions, the majority of publicly accessible cryptocurrency platforms as well as many other untrusted decentralized computing platforms are reliant on proofs of work and thus trend toward excessive waste. The trend to excessive waste increases with participation and, to be sure, cryptocurrencies and untrusted decentralized computing platforms in general have experienced huge growth in recent years.

In many cases, the form of proof of work used is problematic because it probabilistically rewards replication and parallel execution of a large number of instances of the proof of work task, e.g., by attempting to compute a hash collision with a threshold number of digits with a large number of ASICs concurrently in case one process happens to arrive at a valid result to secure an award. The more CPUs a miner has spinning, the better their odds of a reward. This incentivizes wasteful practices.

In the Bitcoin blockchain and other similar platforms, the systems executing these proofs of work are often called miners. To extend a block, in these systems, the miner must provide a corresponding proof of work for a challenge, c. One example of a challenge c is computing a nonce that results in a cryptographic hash having particular properties, such as a hash generated by a SHA256, MD5, or other one-way function with a certain number of leading zeros. The hash is often based on this nonce and the block to be extended and the payload data (e.g., transactions and their corresponding timestamps with respect to cryptocurrencies or other data) of the block to be added. Block payload data may be dependent on specific application of a decentralized computing platform. For example, in cryptocurrency blockchains, block payload data may be transaction data and cryptographic hashes thereof stored a tree, like a binary tree of cryptographic hash pointers, such as Merkel tree. Decentralized computing platforms for other applications may similarly use trees (like Merkle trees, such as radix trees) corresponding to each block to store cryptographic hashes of payload data, for example, the cryptographic hash may be representative of a file or other data, for which generation of the cryptographic hash of the file proves storage of the file. Other data structures may support similar functionality without being a tree, such as other forms of directed acyclic graphs of cryptographic hash pointers, like a linked list of cryptographic hash pointers, and the like.

A proof of work may include a value, which may be referred to a nonce, for which a hash value (e.g., the hex value) of the cryptographic hash of c and the value is less than a difficulty factor (e.g., a very small hex value). These mining systems execute a series of hashing functions, such as SHA256 for the Bitcoin platform, with different nonce values until a given miner finds a nonce that satisfies the proof. The given miner may report on a network the nonce and the block for which the nonce was generated, the veracity of which is verifiable by other entities according to the proof such that other miners may accept or reject the block for extending the blockchain responsive to verification. Oftentimes, multiple different miners find a nonce that satisfies the proof for generating a block. In such an event, miners may reach a consensus on whether to extend the blockchain with a generated block based on veracity of the corresponding proof, veracity of the block payload, and whether that block extends a weightiest chain in the blockchain. These decisions occur at a local level based on a local view of the blockchain but eventually converge (e.g., reach consensus) on an immutable view of the blockchain, although that convergence to the immutable view can sometimes take a few cycles of block generation. Specifically, as more miners, and then a majority of miners, choose to utilize a same view of the blockchain, as cycles of block generation build on that same view it becomes exponentially more difficult (e.g., computationally infeasible or, at least, honest operation provides a greater expected value of reward than malicious) for a minority of miners to assert a different view. For example, in Bitcoin blockchain, the number of cycles until a block is generally considered immutable (i.e., computationally infeasible to modify without rendering the chain internally inconsistent and, thus, being tamper evident) being 6. This value can also be considered as the depth, or distance, of a block in the chain of blocks from a current block on which miners are operating on, with the immutability property of a given block increasing with depth. These values may differ depending on factors such as the time it takes to generate blocks.

A proxy for compute power available for proofs of work within the Bitcoin platform is the hash rate, which has increased, essentially, exponentially from less than a trillion hashes per second (TH/s) at inception, to 10 TH/s after three years, to 2,500,000 TH/s after eight years, to 60,000,000 TH/s in ten years. Within untrusted decentralized computing platforms reliant on proofs of work, the above described difficulty factor is increased (e.g., the range of accepted hex values for a valid proof narrows) to control the time (typically on the order of minutes, like 2-20 minutes, which may have a target average, like 10 minutes) that it takes for the participant miners to find a proof. Currently, the difficulty of mining for some platforms has increased to the point where casual a casual participant having a small mining operation (e.g., a personal computer, a server, or a few servers) with relatively little compute power compared other participants might expect to receive a reward for generating a block on the order of years or tens of years. As a result of that increase in difficulty, some participants with miners have formed mining pools which share compute resources and proportionally split rewards. This unionization of sorts, driven by the nature of reliance on proofs of work, eats away at the security values of the platform, which is based on honest miners controlling at least 51% of the total compute power (though that should not suggest that some attacks, as discussed herein, are not viable with less than 51% of the total compute power). Importantly, as noted above, this trend is not isolated to the Bitcoin platform, and there exists many such similar platforms, resulting in millions of watts of electricity dedicated solely to computing proofs of work across these platforms. Considering the broad applications of cryptocurrency and other untrusted decentralized computing platform, this waste is at best viewed as a necessary evil. However, the benefits of such untrusted decentralized computing platform are not guaranteed to outweigh the increase in waste indefinitely. Thus, there exists a need for untrusted decentralized computing platforms that are not reliant on computationally expensive proofs of work.

One proof that attempts to circumvent proofs of work is proof of stake. However, a different set of attack surfaces are opened in untrusted decentralized computing platforms reliant on proof of stake. Generally, proof of stake replaces miners with what are called validators, a example being Ethereum. In order to validate a block, a validator commits some of their currency as stake. In turn, the validator may start validating the blocks. In other words, when a validator encounters a block to that might extend a chain, the validator will commit stake to the block. If a block gets appended to the blockchain, then the validators who committed stake to that block receive a reward proportionate to their stake. Proof of stake, unlike proof of work, is computationally cheap. Thus, proof of stake at least mitigates the compute power arms race in proof of work based platforms. However, as described above, a shift away from proof of work opens a different set of possible attack surfaces.

Most attacks on blockchains can be roughly classified as short range or long range attack types. Short range attacks refer to attacks which only involve the last few blocks, whereas long range attacks are attacks where an adversary tries to generate a chain that forked (from the chain seen by the honest participants) many blocks in the past. In the context of proof of work platforms, an example short range attack includes selfish mining where a malicious participant strategically withholds blocks to get an unfair share of the block rewards, or double spending where the malicious participant tries to generate a chain in private that is sufficiently long to double spend. In the context of Bitcoin, as a block at depth 6 can be considered confirmed, in some cases a malicious participant with significantly less than 50% of the hashing power may have a reasonable chance in succeeding at such an attack (which requires growing a chain of length 6 faster than the honest miners) without safeguarding. Though such an attack is possible, there exists reasonable difficulty here and a simply safeguard in many cases is to simply increase (e.g., locally) the depth value (e.g., greater than 6 for Bitcoin) at which point a block is locally considered immutable by an honest participant.

In proof of stake platforms where the proof is computationally cheap, malicious participants can more easily launch such attacks. For example, a malicious participant may launch a grinding type attack by deviating from the honest participant rules and computing many more proofs than specified by the protocol (in the context of proofs of stake these attacks are called nothing at stake problems). Example grinding type attacks may include digging and double dipping. Grinder refers to an attempt to extend one particular block in many different ways and double dipping refers to an attempt to extend many different blocks, not just the ones specified by the protocol. Grinding attacks are not the only security problems that result from efforts to replace proofs of work with other proof, like proofs of stake. The above noted long-range attack refers to attack types where a malicious participant tries to generate a chain that forked from the chain the honest participants saw a long time ago. Long range attacks are not a major concern for proof of work platforms but are a major problem for proof of stake reliant platforms.

An example long range attack against proof of stake blockchains takes advantage of the proof of stake premise itself and the cheapness of proof generation. For example, it may be sufficient for the malicious participate to hold large stake (i.e., the secret keys allowing to spend currency) that was valid at some point in the past (but given the current chain can be worthless). The old keys can be used to fork (e.g., generate a competing chain off a block in) the chain at the point (e.g., the depth in the chain) where the coins where valid. The competing chain that is maliciously generated is then utilized to bootstrap a chain that appears valid in the present. A malicious participant may potentially acquire such stake at low cost, e.g. by buying a large fraction of currency on the platform and then immediately liquidating them. Absent an assumption of some trusted participants or a requirement of participants to engage online sufficiently frequently to force check-points at sufficiently short intervals the attack is likely to succeed. Thus, there too exists a need for untrusted decentralized computing platforms not reliant on proof of work that minimize the attack surfaces opened by a shift away from compute intensive proofs.

FIG. 1 illustrates an example computing environment 100 within which an untrusted decentralized database may be implemented to mitigate some or all of the above-described issues. The computing environment 100 may include an untrusted decentralized computing platform by which the untrusted decentralized database may be implemented (and in some cases, the techniques described may be applied to computation of the platform, e.g., to arrive at consensus regarding the output of a smart contract). In some embodiments, the untrusted decentralized computing platform manages a cryptographic currency. In some embodiments, generation of digital assets for the cryptographic currency and transactions pertaining to ownership and exchange of those digital assets are stored within the untrusted decentralized database. In some embodiments, the untrusted decentralized database is a directed acyclic graph of cryptographic hash pointers with terminal nodes having cryptographic digests or records of transactions tracked with the database. In some embodiments, the untrusted decentralized database is a blockchain-based database.

Disclosed embodiments of the decentralized computing platform illustrated within the example computing environment 100 may mitigate at least some of the challenges with existing decentralized computing platforms, such as by reducing waste relative to existing decentralized computing platforms reliant on compute power for probabilistic, parallelizable proofs of work. Examples of waste may include, but are not limited to (which is not to suggest that any other list herein is limiting), electrical power consumption for proof generation, compute power, physical space of computing systems capable of earning assets, and material waste of replacement of specialized computing hardware relative to other platforms reliant on proofs of work. Reduction of waste need not be absolute compared to those systems, but rather relative to other platforms having comparable maturity, number of participants, number of transactions handled, and the like. In some embodiments, the decentralized computing platform utilizes a proof of space to reduce compute power consumed to generate proofs relative to certain types of proof of work based platforms.

Disclosed embodiments of the decentralized computing platform illustrated within the example computing environment 100 may mitigate at least some of the challenges with existing decentralized computing platforms not reliant on proofs of work, such as by maintaining high security values not inherently afforded to those other platforms not reliant on proofs of work. In some embodiments, the decentralized computing platform utilizes a verifiable delay function (VDF) to maintain high security values relative to other platforms not reliant on proofs of work. In some embodiments, the decentralized computing platform uses proofs of space and VDFs to reduce compute power required to generate proofs relative to previous proof of work based platforms and maintain robust security values. In some embodiments, the decentralized computing platform alternates (e.g., in time, for instance for different blocks in a sequence) proofs of space with VDFs. In some embodiments, the decentralized computing platform includes a consensus layer for extending a blockchain with a block based on a proof of space and a VDF output.

FIG. 1, for example, illustrates an example of a decentralized data store as a directed acyclic graph 105. The example directed acyclic graph 105 may include a number of blocks, e.g., blocks 1-3, where each next block references a prior block so as to form a chain of blocks or "blockchain." Each block may include a root of a Merkle tree of cryptographic hash pointers with leaf nodes having corresponding data, e.g., data 1-3 (which in some cases may be a cryptographic hash digest of off-chain data). In some embodiments, example of data of a block include transaction records that describe the creation and transfer of digital currency to and between participants in the decentralized computing platform. Those various records may be reported amongst participants of the decentralized computing platform over the network 121 and subsequently published (e.g., subject to verification) to the directed acyclic graph 105 of cryptographic hash pointers, such as when a block is generated that includes one or more records. In some embodiments, records may include information pertaining to (e.g., containing the result of computation of) proofs of space, VDFs, transactions, and rewards for generation or verification of a block.

An example transaction may specify the recipient of an amount of digital currency (or other rivalrous digital asset), the transferor of the digital currency (e.g., other participant or as a reward), and an associated timestamp. Those transactions records may be stored within the data of the block, which may be referred to as a block payload, block data, and the like herein. Although not shown, transaction records within the data of a block may be stored within one or more nodes. Conceptually, those nodes storing transaction records may be visualized as leaf nodes within a tree-like structure, like a binary tree, or binary Merkle tree, having a root node and a plurality of intermediate parent nodes, whereby each leaf node may be referenced to the root node via a plurality of references through intermediate parent nodes. In some embodiments, references are pointers indicative of a location of some data (like previous transaction data) stored within the decentralized data store. In some embodiments, references are associated with a hash, like a cryptographic hash, based on previously stored data to afford a tamper-evident storage scheme. Thus, for example, an authoritative version may be considered immutable.

The term "immutable" should not be read to require that immutable data be written to a form of physical media that prevents subsequent writes (e.g., a ROM or write-once optical media). Rather, the term "immutable" refers to a data structure that does not support modifications to data once written. In some cases, this feature is afforded by making the data structure tamper evident, e.g., computationally infeasible to modify committed data without rendering the data structure internally inconsistent. In some cases, the data structure computational infeasibility of undetectable modifications may be afforded by chaining the above-described cryptographic hash values, such that verification of tampering consumes less than $100,000^{th}$ of the computing resources (e.g., in time or memory complexity) of computing resources needed to modify the data structure to be consistent with a modified previously written record. In some embodiments, references are hash pointers, which may be cryptographic hash pointers, and the references themselves may afford a temper-evident storage scheme within the data of the block. In some embodiment, the data of the block includes binding information, like a cryptographic hash, cryptographic hash pointer, cryptographic signature, or a combination thereof indicative of which block the data corresponds. In some embodiments, the binding information binds the data to verification information for the block to mitigate manipulation of the block and a blockchain including the block.

For example, in some embodiments, in addition to the data of a block, each block may also include corresponding verification information, e.g., verif 1-3. The verification information for a block may include a proof of space and a VDF output for the block. A block, e.g., block 3, having data3 may only be considered a valid extension of the blockchain (e.g., by participants) when verification information, e.g., verif 3 has also been generated for the block.

The verif3 and data3 of block 3 may be bound to each other, such as by the data3 referencing, sharing, or otherwise including one or more values that bind the data3 to the verif3 information. In some embodiments, this binding data is generated in association with the proof of space. For example, when a proof of space is generated for a new block, payload data for the data of that new block may be generated and a signature generated over the proof of space and the payload data. The signature may be included within the data portion of the new block, e.g., in association with the payload data. Further, the signature may be generated over a previous block, such as to also provide verification as to which previous block the new block extends from within the blockchain. In some example embodiments, the signature is generated over a cryptographic hash of the previous block data, the proof of space, and the payload data, each or some of the values of which may be a cryptographic hash.

Similar to the signature generated over the data of the previous block included in the data of a new block providing verification as to which previous block the new block extends from within the blockchain, the verification information of the new block may be based on verification information of the prior block. For example, a challenge for the proof of space may be based on a VDF output within the verification data of the prior block. In some embodiments, the challenge for the proof of space is a hash of a signature generated over the VDF output of the prior block. Here, this ensures that execution of the proof of space for the new block is delayed until the VDF output for the prior block (e.g., to complete the prior block) is generated. The signature used (i.e., the same key) over the VDF output of the prior block that is then hashed to generate the challenge may be the same signature as that used to bind the data for the new block to the verification information for the new block (e.g., when the proof of space is generated based on the challenge). Similarly, a challenge for the VDF of the new block, e.g., block 3, may be based on the verification information of the prior block (e.g., verif2). For example, the challenge for the VDF of the new block may be a hash of verif2. Here, this ensures that execution of the VDF for the new block is delayed until the verification information for the prior block is complete. A time parameter, or difficulty parameter, for the VDF may be based in part on a hash of the proof of space of the prior block. For example, the time parameter may be a hash of the proof of space of the prior block times a current T difficulty value. Current T difficulty value may be based on a target time for block generation divided by an elapsed time of actual block generation. Thus, for example, actual average time of block generation may be biased towards the target time. The elapsed time between the generation of any two blocks of any distance (bounded by block position and chain length) may be determined according to a difference in timestamps between the blocks. In some embodiments, the difficulty value T is computed on a cycle, e.g., after every X blocks. Thus, for example, a current difficulty value T may be equal to X (blocks)*Target (seconds)/Elapsed time in seconds last X number of blocks.

Notably, the VDF and proof of space for a given block may be determined independent of each other within that block, though may be based on verification information from the prior block, and in some embodiments, verification information corresponding to the other function from the prior block. In other words, generation of the VDF and proof of space for a given block are delayed until specific information becomes available from the prior block and generation of the VDF and proof of space for the given block based on that specific information having been available is verifiable. Thus, in some embodiments, different participants generate the proofs of space and the VDFs making up the verification information. Conceptually, the directed acyclic graph 105 may be considered in terms of primarily a single chain of blocks, e.g., block 1-3, by virtue of the binding between verification information and data of respective blocks and the data of a block including a signature verifying which prior block it extends. However, it may also be considered in terms of a dual chain of blocks, for which a first chain is primarily a single chain of data blocks and the second chain is primarily a single chain of verification blocks. For example, as referred to herein, the data of blocks may be conceptually considered as foliage, like a chain of foliage blocks, and the verification information of a block may be conceptually considered as trunk, like a chain of trunk blocks. As the data (e.g., a foliage block) of a new block reference the data of the previous block in the chain it extends, a foliage chain forms from linked foliage blocks. Similarly, as the proof of space and VDF output in the verification information (e.g., a trunk block) of a new block are reliant on the verification information of the previous block in the chain it extends, a trunk chain forms from linked trunk blocks. In turn, the binding information of a foliage block, e.g., in the data of a block, attaches that foliage block to a given trunk block, e.g., the verification information of that block. Given the independence of the VDF and proof of space for a given block, some functions need not operate on the whole chain. For example, a VDF function may generate a VDF output for a new block based on the verification information of a prior block without necessarily retrieving data of the block.

In some embodiments, node content of the directed acyclic graph 105 of cryptographic hash pointers, which may include nodes having content representing blocks, e.g., blocks 1-3, data, e.g., data 1-3, transaction records within the data, verification information, e.g., verif 1-3, proofs of space and VDF within verification information, and the like, may be verified as having not been subject to tampering by determining whether that content is consistent with one or more chains, or other associative data structures (e.g., trees), of cryptographic hash pointers of the directed acyclic graph. In some embodiments, nodes of the directed acyclic graph of cryptographic hash pointers may include as node content a node identifier (e.g., an address in the graph) that distinguishes a node from other nodes of the graph, identifiers or one or more other nodes of the graph to which a cryptographic hash pointer of that node points, and an associated cryptographic hash values based on node content of those other identified nodes to which the cryptographic hash pointers point (in some cases, the pointing is from one and only one node to one and only one node for adjacent nodes). As additional nodes are appended to the directed acyclic graph, a chain of cryptographic hash pointers may be formed such that each subsequent node includes as node content one or more cryptographic hash values based upon some, and in some cases all of the previously published information published to the directed acyclic graph of cryptographic hash pointers. In some embodiments, following these pointers may be requested by a verification function which verifies that stored transaction records have not be tampered with or subject to other transactions such as to verify participant ownership of digital currency or other digital asset within the decentralized computing platform as described by transaction data, verify proofs of space were generated according to rules and criteria specified by the decentralized computing platform, verify VDF outputs were generated according to rules and criteria specified by the decentralized computing platform, and the like.

The directed acyclic graph 105 of cryptographic hash pointers need not be referred to as a graph, or as having nodes or edges, in program code to constitute a graph, provided that a data structure affords the same or similar functionality, even if that data structure bears different labels. Similar qualifications apply to transaction records, data/foliage blocks, verification information/truck blocks and the information they store or represent as described herein. For instance, graphs may be encoded in objects in object-oriented programming environment, key-value pairs, entries in a relational database, documents encoded in a hierarchical data serialization format, or combinations thereof, without being labeled as graphs.

In some embodiments, to expedite write operations (and in some cases, afford faster reads or verifications of reads), some embodiments may consolidate writes to the directed acyclic graph 105 of cryptographic hash pointers. For instance, some embodiments may form sub-graphs of directed acyclic graphs of cryptographic hash pointers that are collectively appended to an extant, larger directed acyclic graph of cryptographic hash pointers. Some embodiments may form a graph based on linkages binding one or more nodes of one sub-graph to another sub-graph. In some embodiments, the directed acyclic graph 105 of cryptographic hash pointers may include a linked list, tree, or skip list of the sub-graphs. In some embodiments, the sub-graphs may be referred to as blocks, e.g., example blocks 1-3, constituent blocks of those blocks, e.g., data1 and verif1 of block1, and so on. For example, data 1 may storing one or more transactions pertinent to the examples described herein, and each may include 2, 4, 8, 16, 32, 64, 128, 256, 512, 1028, (e.g., 2^nth power of nodes) or more or less nodes, and one or more of those nodes may include node content, such as one or more of the various transaction records described herein.

In some embodiments, the appended sub-graphs may be implemented with a particular type of directed acyclic graph that affords relatively fast verification in addressing of published information. In some embodiments, the sub-graphs that are collectively appended may be binary trees, quad trees, radix trees, or the like. In some embodiments, the sub-graphs are Merkel trees, such as Patricia trees (lists herein should not be read as necessarily specifying mutually exclusive categories). In some embodiments, transaction records may be stored as node content of leaf nodes of a binary tree data structure that is collectively appended to the directed acyclic graph of cryptographic hash pointers upon completion of the tree data structure (e.g., achieving a threshold number of nodes, such 2^nth power of nodes to include in the tree data structure). Or in some cases, intermediate nodes of the tree data structure may include nodes having content in which published information is stored.

In some embodiments, the computing environment 100 includes various computing devices participating within the decentralized computing platform. For example, the computing environment may include a number of computing nodes, an examples of which may function as a space server 130 or VDF server 140. Although the space server 103 and the VDF server 140 are illustrated separately, a computing node of a decentralized computing platform may include multiple computing nodes and thus may include an instance of a space server and a VDF server. Moreover, there need not exist any specific prohibition against a computing node implementing multiple instances of each one of space server 130 and VDF server 140. However, possible benefit realized by a computing node running more than one instance of each may reduced. In fact, any such benefit may be significantly reduced as division of resources may not provide advantage over consolidation. While only one space server 130 and one VDF server 140 are shown in detail, embodiments may include many more of each, for instance, numbering in the dozens, hundreds, thousands, hundreds of thousands, millions, or more. In some embodiments, one or more of the servers 130, 140 may be rack-mounted computing devices in a data center, for instance, in a public or private cloud data center. In some embodiments, various ones of the servers 130, 140 may be geographically remote from one another, for instance, in different data centers. In some embodiments, personal computing devices, whether a mobile computing device, client, or server device in user homes, may also function as a computing node instantiating one or more of the space 130 and VDF 140 servers. Thus, in some embodiments, the computing platform that the computing nodes, represented by servers 130, 140, instantiate may be relatively to very decentralized where at least some of the computing nodes are operated by various different participants and may also perform other functions for various different purposes. Various different ones of the space servers 130 and the VDF servers 140 may communicate over a network 121, such as to report block data, proofs of space, and VDF outputs for blocks.

A client device 120, like a mobile client device, may include a wallet application 125 for managing participants' digital currency. For example, the wallet application 125 when executed by the client device 120 may cause the client device to interface with the decentralized computing platform instantiated by the various space servers 130 and VDF servers 140 over a network 121. In some embodiments, the wallet 125 may be configured to cause the client 120 to request the verification of transaction records stored within the directed acyclic graph 105, such as to cause a server of the decentralized computing platform to determine and return a balance, determine whether a transaction is verified and return the result, and the like, or to submit a new transaction for recording to the directed acyclic graph 105, and the like. Thus, for example, a participant may utilize a client device 120, like a mobile telephonic device executing a wallet application, to view their cryptocurrency balance and submit transactions for transferring cryptocurrency to other participants. In some embodiments the wallet application 125 is configured to publish a transaction to the network 121 in response to user input, such as an address of a wallet of another user for transferring an amount of cryptocurrency held by the user. Although only three client devices 120 are shown, 100's, 1000's, or 1,000,000's of other client devices may participate within the decentralized computing system and be geographically distributed along with computing nodes. However, that is not to say that in some embodiments a computing node or nodes may be collocated (or in some cases, all be deployed within a single computer cluster).

In some embodiments, the space server 130 generates proofs of space and the data for a block. The space server may include a farm initializer 132 which obtains information about the current state of the directed acyclic graph 105, like a blockchain, from other participants over the network 121. The farm initializer 132 may store the information about the graph 105 locally, such as within a local data structure (e.g., like data structure 101A), such that space server 130 may operate on and update information for the graph based on determined information and new information received over the network. For example, the space server 130 may receive information about one or more transactions for including in the data of a next block to generate. The farm initializer 132 may also determine one or more space parameters, which may include a key-pair for the space server 130. The key pair may include a private key and a public key, and the private key may be operable to sign data to generate a signature. The public key may be reported with the signature and along with the data that was signed such that other participants may verify the signature. In the context of block generation, the private key may be retained in secret by space server 130, and thus apt for binding the data of a block to the proof of space generated for the block in connection with the data.

In some embodiments, the farm initializer 132 executes one or more of the operations (e.g., operations like those in SpaceFarmer.init) like those indicated below on data like that indicated below. Example operations (such as described below and in U.S. Provisional Application No. 62/850,221, which is incorporated by reference herein in its entirety) may include but are not limited to:

---

Algorithm 1 SpaceFarmer.init

1: Global Parameters: N
2: $\mathcal{C}$ ← Chain.init                    ▷ extract view from network
3: (pk, sk) ← Sig.keygen                         ▷ sample public/secret signature key pair
4: $\mathcal{S}$ ← PoSpace.init(N, pk)           ▷ initialize space of size N with identity pk
5: $\mathcal{S}$.sk := sk                        ▷ add sk to the stored file
6: Initalize a vector pos_count to all 0         ▷ see Remark 5
7: Output:
8: $\mathcal{S}$ = ($\mathcal{S}$.Λ, $\mathcal{S}$.N, $\mathcal{S}$.pk, $\mathcal{S}$.sk), pos_count   ▷ State for SpaceFarmer.farm
9: $\mathcal{C}$                                 ▷ State for Chain.update

---

The view of the chain extracted from the network may be stored within a data structure (e.g., like data structure 101A) as graph data. The other data, like the generated keys, may be stored as spaceparams for generating proofs of space.

In some embodiments, a proof of space indicates an allocation of a non-trivial amount of memory or disk space to solve a challenge. Unlike proofs of work, proofs of space utilize storage capacity as a resource rather than compute power. Moreover, like a proof of work, a proof of space is verifiable. For example, a proof-of-space may be generated responsive to a challenge, which may be determined as described herein. For example, the challenge may be based on a hash of a VDF output or other data, like a hash of a signature utilizing the secret key of the of the space farmer over a VDF output of a previous block. Responsive to the challenge, a proof of space is generated that complies with the challenge. The proof may max out an O of available memory, hard-drive capacity, or both and be verifiable. The proof of space is at least relatively difficult to forge for the space server to pass the verification if it does not actually reserve the claimed amount of space. An example proof of space may utilize a hard-to-pebble graph, for which verification is predicated on the space server building a labeling of a hard-to-pebble graph. The space server commits to the labeling and the challenge specifies random locations in the commitment. Various embodiments and examples of proofs of space are discussed herein, and in the context of decentralized computing platform proofs, as well as more generalized applications, additional embodiments and examples are in U.S. Provisional Application No. 62/850,221, which is incorporated by reference herein in its entirety.

In some embodiments, the space server 130, after initialization of the data structure with a local graph view and space params, executes one or more operations in a loop (e.g., operations like those in SpaceFarmer.loop) as illustrated (e.g., which may include looping through iterations of operations ascribed to the farmer 134 and the updater 136). Example loop operations (such as described below and in U.S. Provisional Application No. 62/850,221, which is incorporated by reference herein in its entirety) may include but are not limited to:

---
Algorithm 2 SpaceFarmer.loop
---
1: loop
2:   Wait for block(s) $\Gamma$ to be received from the network
3:   $(\Gamma_f, \Gamma_n) \leftarrow$ Chain.update($\Gamma$)
4:   $\forall \gamma \in \Gamma_f$: SpaceFarmer.farm ($\gamma$)   ▷ Algorithm 3
5: end loop
---

The farmer 134 may execute one or more operations (e.g., operations like those in SpaceFarmer.Farm) of a farming function. Example operations (such as described below and in U.S. Provisional Application No. 62/850,221, which is incorporated by reference herein in its entirety) may include but are not limited to:

---
Algorithm 3 SpaceFarmer.farm
---
1: Global Parameters: $K$  ▷ # of proofs per slot ($K$ = 3 in Chia)
2: Input: $\gamma_i = (\beta_i = (i, \sigma_i, \tau_i), \alpha_i)$.  ▷ finalized, fresh & valid block at depth i
3: State: $S = (S.\Lambda, S.N, S.\text{pk}, S.\text{sk})$, pos_count
4: if pos_count(i + 1) = $K$ then  ▷ if already generated $K$ PoSpace
5:   return without output  ▷ at depth i + 1 ignore this block
6: end if
7: pos_count(i + 1) $\leftarrow$ pos_count(i + 1) + 1
8: $\mu \leftarrow$ Sig.sign($S$.sk, $\tau_i$)  ▷ compute signature of last VDF output
9: c $\leftarrow$ H($\mu$)  ▷ challenge is hash of this signature
10: $\sigma_{i+1} \leftarrow$ PoSpace.prove($S$, c)  ▷ compute PoSpace
11: $\sigma_{i+1} . \mu := \mu$  ▷ keep signature as part of the proof
12: Generate data$_{i+1}$  ▷ create payload for this block
13: $\phi_{i+1} \leftarrow$ Sig.sign($S$.sk, ($\alpha_i$, $\sigma_{i+1}$, data$_{i+1}$))  ▷ signature for foliage
14: Chain.update(i + 1, $\sigma_{i+1}$, $\alpha_{i+1} = (\phi_{i+1}, \text{data}_{i+1})$)  ▷ Cf. Remark 7
---

The updater 136 may execute operations to update information for graphs based on information received over the network 121 or when called by the farmer 134 or the loop. For example, data may include new blocks reported from the network, VDF outputs for a finalized block, transactions for a next block, and the like. In some embodiments, the updater 136 reports proofs of space and block data generated by the farmer 134 for a new block on the network.

In some embodiments, the VDF server 140 generates VDF outputs based on information in a previous block, like verification information of the previous block, for a new block. The VDF server 140 may include a VDF initializer 142 which obtains information about the current state of the directed acyclic graph 105, like a blockchain, from other participants over the network 121. The VDF initializer 142 may store the information about the graph 105 locally, such as within a local data structure (e.g., like data structure 101B), such that VDF server 140 may operate on and update information for the graph based on determined information and new information received over the network. For example, the VDF server 140 may receive information about one or more new blocks output by space servers 134, for which VDF outputs are generated for prior to a new block extending a previous block in the blockchain. The VDF initializer 142 may also determine one or more time parameters (e.g., TimeParams), which may stored within a local data structure (e.g., like data structure 101B). As described above, a time parameter, or difficulty parameter, for a VDF may be based in part on a hash of the proof of space of the prior block. For example, the time parameter may be a hash of the proof of space of the prior block times a current T difficulty value. Current T difficulty value may be based on a target time for block generation divided by an elapsed time of actual block generation. Thus, for example, actual average time of block generation may be biased towards the target time. The elapsed time between the generation of any two blocks of any distance (bounded by block position and chain length) may be determined according to a difference in timestamps between the blocks. In some embodiments, difficulty value T is computed on a cycle, e.g., after every X blocks. Thus, for example, a current difficulty value T may be equal to X(blocks)*Target(seconds)/Elapsed time in seconds last X number of blocks.

In some embodiments, the VDF initializer 142 executes one or more of the operations (e.g., operations like those in TimeLord.init) like those indicated below on data like that indicated below. Example operations (such as described below and with reference to a time lord, proof of elapsed time, and the like in U.S. Provisional Application No. 62/850,221, which is incorporated by reference herein in its entirety) may include but are not limited to:

---
Algorithm 4 TimeLord.init
---
1: $C \leftarrow$ Chain.init  ▷ extract view from network
2: Initalize vectors running and finalized where for every i running[i] = 0 and finalized[i] is the number of finalized blocks in $C$ at depth i.
3: Output:
4: finalized, running  ▷ State for TimeLord.finalize/finalized/runPoSW
5: $C$  ▷ State for Chain.update
---

In some embodiments, the VDF server 140, after initialization of the data structure (e.g., like data structure 101B) with a local graph view, executes one or more operations in a loop (e.g., operations like those in TimeLord.loop) as illustrated (e.g., which may include looping through iterations of operations ascribed to the VDF Generator 144 and the updater 146). Example loop operations (such as described below and in U.S. Provisional Application No. 62/850,221, which is incorporated by reference herein in its entirety) may include but are not limited to:

---
Algorithm 5 TimeLord.loop
---

```
1: loop
2:   Wait for block(s) Γ to be received from the network
3:   (Γ_f, Γ_n) Chain.update(Γ)
4:   ∀((i, σ,), α, c) ∈ Γ_n : TimeLord.finalize(i, σ, c)    ▷ Algorithm 6
5:   ∀((i, σ, τ), α) ∈ Γ_f : TimeLord.restore(i)            ▷ Algorithm 8
6: end loop
```

In some embodiments, the VDF generator 144 executes one or more of the operations (e.g., operations like those in TimeLord.finalize, TimeLord.startVDF, or TimeLord.restore) like those indicated below on data like that indicated below to finalize a block (e.g., a block having a proof of space and data bound to the proof of space as generated by a space server 130). Example operations (such as described below and with reference to a time lord, proof of elapsed time, VDF, and the like in U.S. Provisional Application No. 62/850,221, which is incorporated by reference herein) may include but are not limited to:

---
Algorithm 6 TimeLord.finalize
---

```
1: Global Parameters: T, κ
2: Input: β_i =(i, σ_i) ▷non-finalized, fresh & valid block for depth i received
3: c (= H(β_{i-1}))                    ▷hash of previous trunk block
4: State: finalized, running
5: if finalize[i] = κ then             ▷already finalized κ blocks for this slot
6:    return with no output
7: end if
8: t := 0.H(σ_i) · T                   ▷VDF time parameter required to finalize this block
9: if finalize[i] + running < κ then   ▷ less than κ proofs finalized or running
10:    start thread TimeLord.startVDF(i, c, t)   ▷to finish at time now + t
11:    running[i] := running[i] + 1
12: end if
13: if finalize[i] + running[i] = κ then   ▷exactly κ proofs finalized or running
14:    if the slowest VDF thread for slot i will finish at time > t + now then
15:       abort the thread of this VDF
16:       start thread TimeLord.startVDF(i, c, t)
17:    end if
18: end if
```

---
Algorithm 7 TimeLord.startVDF
---

```
1: State: finalized, running
2: Input: i, (c, t)
3: τ_i ← VDF.solve(c, t)  ▷start thread computing VDF,
    if this thread does not get aborted it will output τ_i in time t
4: finalized[i] := finalized[i] + 1
5: running[i] := running[i] - 1
6: Chain.update(i, τ_i)
```

---
Algorithm 8 TimeLord.restore
---

```
1: State: finalized, running
2: Input: i          ▷fresh, valid & finalized block for depth i was received
3: if running[i] > 0 and running[i] +finalized[i] = κ then
4:    abort the thread TimeLord.startVDF for slot i scheduled to finish last
5:    running[i] := running[i] - 1
6: end if
7: finalized [i] := min{finalized [i] + 1, κ}
```

The updater 146 may execute operations to update information for graphs based on information received over the network 121 or when called by the VDF generator 144 or the loop. For example, data may include new blocks reported from the network, transactions, VDF outputs, finalized blocks, and the like. In some embodiments, the updater 136 reports VDF outputs generated by the VDF generator 144 for finalizing a new block on the network.

Figure 2:
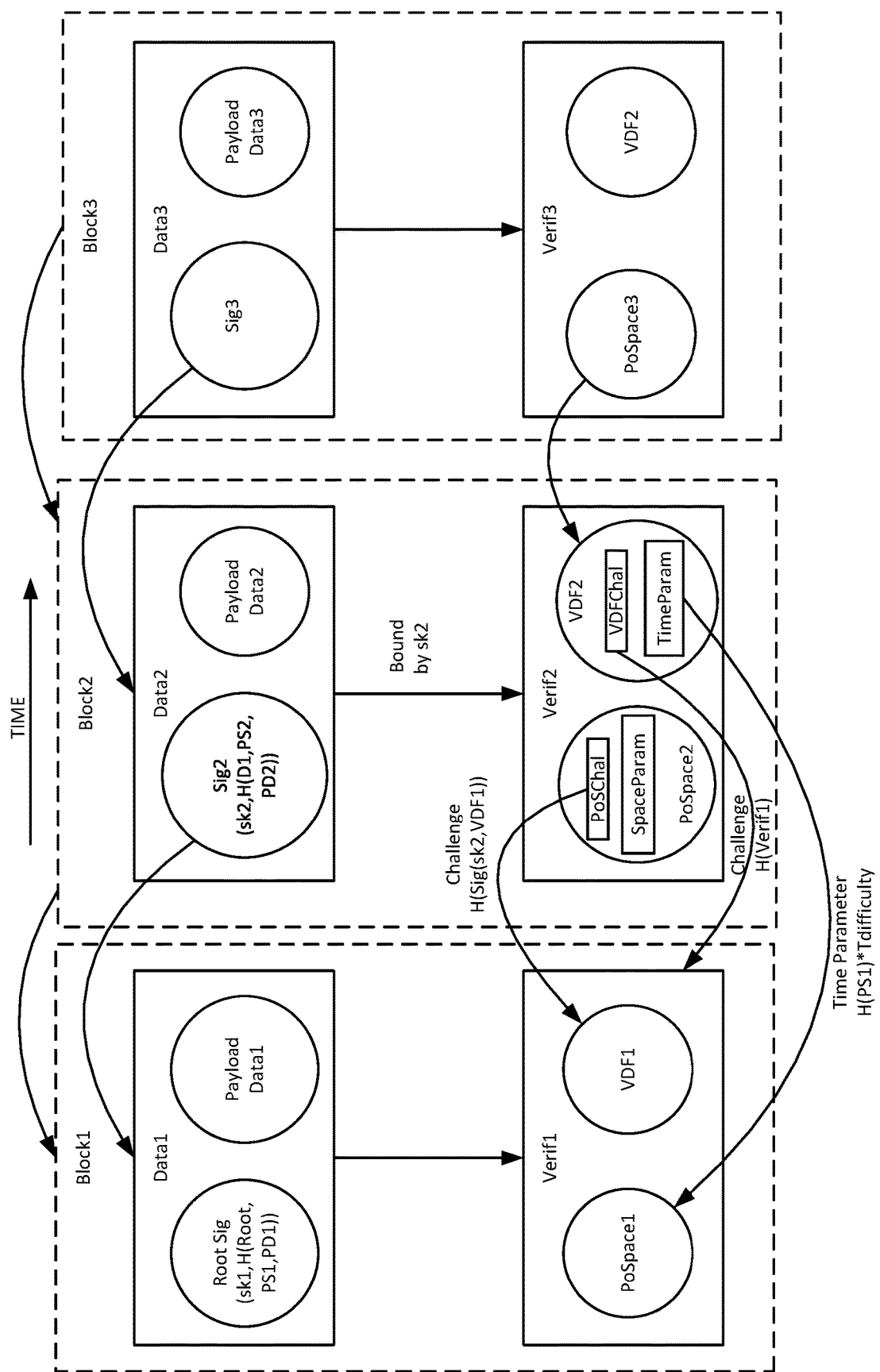
FIG. 2 illustrates an example diagram of block dependencies in a decentralized database, according to an example embodiment.
Figure 3:
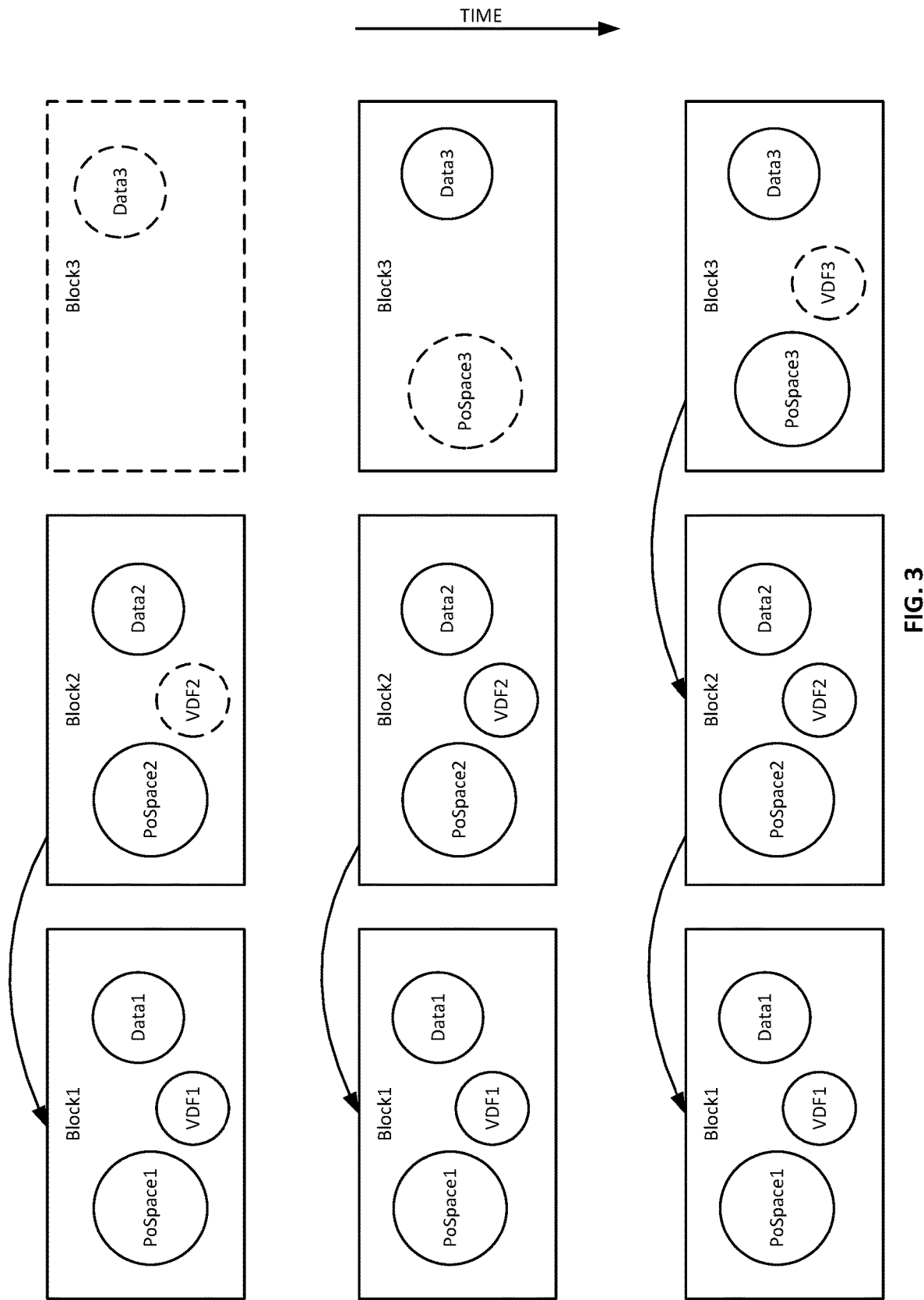
FIG. 3 illustrates an example diagram of a generating a new block in a decentralized database, according to an example embodiment.

Example progressions of a blockchain or blockchain-like graph, or other graph, in accordance with the present techniques as described with reference to FIG. 1, U.S. Provisional Application No. 62/850,221, which is incorporated by reference herein, and the example concepts enumerated below, are illustrated in FIGS. 2 and 3. FIG. 2 illustrates an example of binding between data of a block and verification information of a block, such as by secret key, sk2, of a space server that generate the proof of space 2 and the data 2 for block 2. FIG. 2 also illustrates examples of imputing of data from prior blocks and hashing of data that afford immutability (e.g., in the sense that changes in prior blocks may be identified and some change or changes in one or more prior blocks that also satisfy properties of the data structure is extremely difficult computationally, possibly infeasible computationally or at least economically in comparison to honestly participating).

FIG. 3 illustrates and example conceptual progression of a blockchain in accordance with the present techniques. For example, block 2 is shown as being finalized by the generation of VDF2. Meanwhile, transaction data3 for blocks may be tracked by systems for generating proofs of space. With the VDF2 finalized, a new block may be generated based on data3 bound to the proof of space 3. In turn, the new block 3 may be reported on the network and a VDF3 may be generated for the block 3 to finalize block 3.

Consensus Layer Based on Alternating Proofs-of-Space and Verifiable Delay Functions Building a distributed cryptocurrency that does not have the waste of a proof-of-work based cryptocurrency can be accomplished by using a proof-of-space (POS) protocol. However, POS protocols are susceptible to digging attacks and long range attacks.

Digging attacks are grinding attacks in which adversarial parties try to extend a particular block in the blockchain in multiple ways. In a naive implementation of proof-of-space, challenges are generated using data from the most recent block in the blockchain. In a digging attack, given a block which is to be extended, an adversarial party can generate different challenges from the block by varying the payload data (e.g. transaction subsets, timestamps, etc.) to preview a set of possible challenges from which the most desirable challenge can be chosen by the adversary, making it possible for them to rig the payload data to produce the chosen challenge. Therefore, instead of having one shot at extending the block, as is desired for such a protocol, adversarial parties can skew new challenges in their favor.

Long range attacks are attacks wherein adversarial parties try to generate a new chain forked from the main chain recorded in the blockchain history of honest parties, from a block located some number of blocks in the past of the current block. We consider the "heaviest chain" in a POS-based blockchain to be the one with maximal quality, i.e. the one with lowest summed edge weight. In a naive implementation of POS, it may be possible for an adversarial party to quickly bootstrap a forked chain which is heavier than an honestly generated chain if certain conditions are realized, such as a decrease in the cost of disk space.

In some embodiments, a consensus layer of the untrusted decentralized computing platform alternates a proof of space with a verifiable delay function to reduce compute resource waste relative to systems reliant on compute sources for proofs of work. Specifically, generation of a proof of space may be far less computationally expensive than a proof of work. Alternating between the proof of space and a verifiable delay function (VDF) maintains high security values by extending a blockchain with a block based on a proof of space dependent at least in part on a prior VDF output of a previous block and a VDF output dependent at least in part on a prior proof of space or prior block having a proof of space.

Embodiments may combine proofs of space and verifiable delay functions to create a distributed cryptocurrency which is secure and which does not have the waste of a proof-of-work based cryptocurrency but which maintains safeguards against an attack surface that is relatively open compared to proof of work based systems. The combination of proofs of space and verifiable delay functions according to the techniques described herein may mitigate digging attacks and long range attacks. A VDF may include a function for which execution of the function requires a number of sequential steps, such as a prescribed number of steps to compute, which cannot be parallelized, and whose output can be easily and publicly verified. The consensus layer may specify a protocol for block generation and verification that alternates between proofs of space and VDFs and which honest parties verify to reach consensus on the representation of the information stored within the untrusted database.

Embodiments of a blockchain-like database, such as a directed acyclic graph of cryptographic hash pointers, implemented by the untrusted distributed computing platform may include two constituent chains, like sub-graphs of cryptographic hash pointers. A trunk chain may contain the proof of space and the VDF, and a foliage chain, contains the transactions, timestamps, and a signature binding the foliage to the trunk. While the foliage is susceptible to grinding attacks, the trunk is not. In some embodiments, a challenge for proof of space used to create the next block is sourced from the output of the VDF. Because the VDF is contained within the un-grindable trunk, and because all cryptographic primitives used in the trunk are unique, adversarial parties are unable to alter the challenge by varying payload data. In other words, a consensus layer protocol of the decentralized computing platform may specify generation of a challenge for creating the next block where the challenge is based on the output of the VDF output of the prior block. As a result of this dependency and the sequentiality of the VDF, digging attacks may be mitigated.

Quick bootstrapping of a forked chain relies on fast computation of proofs of space. By requiring the computation of a VDF after each proof of space by way of sourcing the next challenge from the VDF output, embodiments of the consensus layer described herein mitigate quick bootstrapping, thereby preventing long range attacks.

Some embodiments may include, or utilize as an alternate protocol concept, an epoch-like time division to address long range attacks, such that timestamp coordination is required. In other words, honest participants keep track of a global clock and wait for the next epoch to start before proceeding with generation of a new block or component of a block.

Some embodiments may include, or utilize as an alternate protocol concept, a pebbling-based proof of space, which does not have unique encodings. Embodiments of a consensus layer utilizing such a proof may require that proofs of space are registered on the blockchain prior to use.

Some embodiments may include, or utilize as an alternate protocol concept, a variation which might be soft-forked into the blockchain to incorporate VDFs within the foliage chain in order to prevent the creation of retroactive new chains by cabals. Adding these additional VDFs would make it such that pre-planning would be required on the part of the cabals in order to create the new chain, and a new chain would only be able to be branched off from the chain's history as far back as when the cabal began coordinating their efforts.

Difficulty Adjustment for a Combined Proof of Space and Proof of Time Consensus Layer In some embodiments, a consensus layer of the untrusted decentralized computing platform which uses multiple different proofs includes a mechanism for adjusting the difficulty of problems such that the reward payout remains at a consistent rate regardless of external factors.

Combining proof-of-space and proof-of-time means that there are multiple factors, or criteria, which may be adjusted to increase difficulty. Adjusting the difficulty in traditional single-proof platforms may have a defined protocol for a single variable. In contrast to those existing system, the disclosed embodiments of decentralized computing platform may incorporate more than one type of proof within a consensus layer for block generation. In turn, a new solution for adjusting difficulty may be implemented within the consensus layer to control for variation in space allocated for farming and speed of solving a verifiable delay function. Further considerations for that solution recognize another problem, that there exists is an open attack surface for potential grinding attack during a difficulty reset at the end of an epoch. If a difficulty reset happens immediately, it means that it is possible to search for an optimal challenge by forking the chain several times immediately before the difficulty reset and looking at the challenges generated.

Embodiments of the decentralized computing platform may include a consensus layer that alternates the proof-of-space and the proof-of-time (e.g., by a VDF) in implementation, and by multiplying their difficulty factors together a single variable that accounts for difficulty for both proofs may be generated. Challenges can be generated from the single difficulty factor and the product of both challenges may be defined to meet this threshold. Further, adherence to the difficulty factor (e.g., of the proofs of space and VDF of a given block) may be verified by honest participants. In some embodiments, the difficulty factor is recalculated every epoch. An example epoch may be a fixed number of blocks, such as 2016 blocks, as is described within, for example, U.S. Provisional Application No. 62/850,221, which is incorporated by reference herein in its entirety, although different epoch values may be used. To mitigate a grinding attack, the difficulty adjustment may be delayed after an epoch ends rather than implemented immediate. For example, the enforcement of the difficulty adjustment may be delayed by some number of blocks, like a number of blocks equivalent to a fraction of an epoch. This means that it is infeasible for a malicious miner to maintain the forks long enough to benefit from them. Regarding the grinding attack, the fraction of an epoch could be extended to be a greater or lesser amount of time. A final variation might be to bring the difficulty to some exponent other than one. One variation specific to VDF would be to incorporate a constant to the difficulty.

Preventing Malicious Attacks on Proof of Space and Time Blockchains

In accordance with one or more of the above described embodiments of the decentralized computing platform, a shift away from compute recourses allocated to proof of work for consensus opens up additional attack surfaces that are much less of an issue in proof of work based platforms. As described herein, various applications are disclosed that rely on a secure, but untrusted, distributed database that relies on proof of space and time to achieve blockchain consensus (e.g., immutability and therefore security of the data stored within the blockchain). Secure but untrusted may refer the property that of the blockchain in that it may be tampered with but is tamper evident. In other words, no one party may be trusted but consensus may be reached on values within the blockchain because they are based on prior values with verifiability such that insertion or modification of some prior value on which later values are based breaks that verifiability to indicate tampering. Absent safeguarding according to one or more of the various techniques described herein, proof of space and time blockchains could allow for an attacker to extend many different blocks, not just the one(s) specified by the protocol, as unlike with proof of work based blockchains there is no restriction on how many blocks can be processed in a given amount of time. As a result, an attacker could attempt to build many different chains (aka double dipping) with the hope of eventually obtaining a higher quality malicious chain than the current honest blockchain.

In some embodiments, by encouraging participants (aka farmers/miners), such a participants operating a computing node implementing a VDF server or a space server, to create and track multiple chains as well, the attempted attack can be thwarted. U.S. Provisional Application No. 62/850,221, which is incorporated by reference herein in its entirety, describes additional and various supporting scenarios of the concept that by having honest participants compute proofs for multiple blocks at each depth and then tracking those resulting multiple chains the attack surface for double dipping threats may be mitigated in according with the percentage of space honest farming participants (e.g., honest space servers generating proofs of space) control. For example, having farmers perform a proof of space for three blocks per depth, approximately 61.5% of the overall space should be honest to maintain security values (e.g., tamper evidence and consensus on honestly generated blocks). Here, other values for the number of blocks per depth calculated may be used, which may provide additional security in that less space need be honest, but there are tradeoffs. For example, compare the proposal of utilizing 3 blocks to the naive solution where a proof for only one block is calculated. In that case 73.1% of the space must be honest. On the other side of the spectrum, if honest farmers extend every block, then only 50% of the space must be honest (similar to the security metrics for a proof of work blockchain). At that point even the most extreme double dipping attack coincides with the honest farming strategy, but such an effort would be completely impractical. The selection of values presented above, and as described in additional embodiments and examples are in U.S. Provisional Application No. 62/850,221, which is incorporated by reference herein in its entirety, may represent an efficient tradeoff for a particular application, but not another. For example, some applications may prioritize speed over security and select a lower value than 3, while others may select a greater number of blocks to extend to push the amount of honest space required closer to 51%. Here, the value of 3 represents a compromise between two extremes that achieve minimal wasted computation and also maintains a relatively high security value (e.g., approximately 61.5%). Here, although this security factor is less than the maximum achievable 51% for performance, the resource, space, for proofs of space is more accessible to users at low cost (thus increasing the number of participating farmers and reducing benefit of consolidation like pooling).

Examples of Mathematical Class Groups for Verifiable Delay Functions

In accordance with one or more of the above described embodiments of the decentralized computing platform, verifiable delay functions may be executed, such as by the above mentioned VDF server, to adjust block generation time. Computing applications within an untrusted decentralized computing platform which require a computing system, like a VDF server, to spend a designated amount of time waiting are, under the present techniques, structured for cryptographic verification. Verifiable delay functions, like those described herein, are applicable to blockchain systems which implement proof of elapsed time as an alternative to proof of work. Like other aspects of untrusted computing platforms, the delay functions are cryptographically verifiable such that honest participants can verify that any other participant executed the function to completion.

A verifiable delay function that is easy to verify (e.g., verifiable in polynomial time or faster) and for which computing devices cannot achieve speedup through parallelization is useful in a wide range of applications. In some cases, VDFs according to the present techniques, may chain dependent tasks, e.g., conceptually VDF(x)=f''''(f''''(f'''(f''(f'(f(x)))))) for which f is a function that is not easily parallelized, to significantly reduce speedup in generation of VDF output from systems having available parallel compute power relative to systems that do not have available parallel compute power. In some cases, the VFD is implemented in software without requiring trusted hardware from a chip maker to honor guarantees about a hardware-based VFD.

Counterintuitively, this type of VFD inverts the typical way of viewing Amdahl's law, which relates speedup to a number of processors based on a percentage of tasks that can be parallelized. Generally, Amdahl's law is viewed as a problem, but here it is feature. The VFD is designed to increase or maximizes the number of execution tasks that cannot be parallelized, such that the addition of processors to a compute system produces a minimal speedup. For example, the amount of execution time that may be parallelized may be less than 75%, less than 50%, or less than 1%, e.g., to negate advantage of highly parallelized computing systems (e.g., systems having over 16 cores) relative to compute systems with less parallelization. Further, in some cases, the VFD is deterministic, so that there is no or a diminished reward for replicating execution of the VFD task. In some cases, the computational complexity of solving the VFD does not vary among execution instances, varies among less than 3 different amounts (so there is no reward for more than two instances of duplicate execution), varies among less than 10 different amounts, varies among less than 100 different amounts, varies among less than 1,000 different amounts, or varies among less than 10,000 different amounts. In other words, the VFD is either not a lottery ticket or, if there is a probabilistic aspect, the odds are good as long as a system execute the VFD to completion.

However, such functions are difficult to implement in a system where clients will actively try to attack the system. Some delay functions have been successfully implemented in systems where the hardware is known to be secure, such as in the secure hardware element of a mobile device. However, those types of delay functions often do not work in applications where hardware cannot be trusted, such as within an un untrusted decentralized computing platform, or where threat actors are expected to interfere in supply chains of computing systems.

In some embodiments, VDFs according to the present techniques are implemented by tasking the computing systems executing the functions with repeatedly squaring class groups of unknown order. Thus, for example, a verifiable delay function may be constructed from class groups of unknown order and the computing system executing the VDF squares the class groups (repeatedly). As described above, to reduce parallelization, a next operation of the function may rely on the output of the previous operation of the function and there may be minimal overlap between the operations of tasks of those functions on same data to reduce speedup from parallelization. For example, considering the above-mentioned class group, the order of the groups is unknown. If the order was known, the squaring operation could be reduced modulo the order of the group, thus creating a shorter computation time. Using class groups of unknown order (and ensuring that order is difficult for a compute system to determine) means that a trusted setup is not required as calculating the discriminant of the class group, where the discriminant is sufficiently large, is computationally difficult. This means that the order of the class group is effectively unknown. The computational difficulty may mean computationally infeasible within a reasonable amount of time to be applicable (e.g., for an attack against the system), or, at least produces a lower expected value of return that participating honestly within the decentralized computing platform.

In some embodiments, by using binary quadratic forms $ax^2+bxy+cy^2$ with a negative discriminant $\Delta=b^2-4ac$ where the discriminant also has the absolute value of 3 mod 4, and tasking processes to repeatedly square the form, a secure verifiable delay function may generated. A computing system executing the VDF will also need to reduce the forms into smaller, equivalent forms after squaring them otherwise the forms will become too big to compute. A form is considered reduced if $\Delta<0$ and $a>0$ and $a<=c$, but if $a=c$ then $b>=0$. In a server-client architecture, a server may provide the client executing a VDF with a discriminant and a number of iterations of squaring. The client should then derive the classgroup from the discriminant, and present the server a and b from the final generated classgroup after computing the squarings. In the context of a decentralized computing platform, the above mentioned variables may be derived in a verifiable way from prior data, like prior data within a blockchain, or data based on a current block. Thus, for example, other computing system may verify the VDF output as being honestly generated according to the correct input data.

Alternative embodiments may utilize RSA groups (Rivest-Shamir-Adleman) instead of class groups. However, RSA groups require a trusted setup and that the party generating the parameters destroys the keys once the group is generated. If such a party were malicious and did not destroy the keys, the VDF's sequentiality requirement could be compromised. Other classgroups also exist and may also be selected in some embodiments instead of quadratic binary forms.

U.S. Provisional Application No. 62/850,221, which is incorporated by reference herein in its entirety includes additional description of various techniques discussed above. For example, the '221 application includes a technical specification for an example implementation of a decentralized computing platform in accordance with the above described embodiments and which implements aspects of the above described concepts. The technical specification, should be construed as an example embodiment and not limiting as to other possible variations. Moreover, where specific values are used, these values may be illustrative of operating an embodiment in a particular mode, and those values may be altered to operate the example embodiment in other modes. Permutations and different combinations of those values are considered for a range of different embodiments that may prioritize different metrics or tradeoffs in different ways based on the variety of applications discussed herein. Further, where the 221 application makes reference to any necessary features, these features should not be construed as necessary to every embodiment, but merely values utilized within the specific example. Additionally, where the '221 application references to other papers and materials in the "References" sections, each of those papers and materials in each "References" section are incorporated by reference herein in their entirety along with the entire contents of the '221 application. However, those additional papers and materials in the "References" sections are only incorporated by reference herein to the extent that no conflict exists between such material and the statements and drawings set forth herein or in the '221 application. The present techniques described herein claim certain improvements over prior techniques described in those papers and materials. Accordingly, in the event of such conflict, the text of the present document governs, and terms in this document should not be given a narrower reading in virtue of the way in which those terms are used in other materials incorporated by reference. Lastly, where the '221 application cites specific performance metrics or tested values, those should be considered as having a corresponding range or approximation and, although not it may not be explicitly stated, those performance metrics and tested values may improve upon other systems or techniques within the context of decentralized computing platforms and consensus layer protocols and should not be considered absolute or unduly restricted to requiring improvement in some other application unless otherwise stated.

Example Computing System

Figure 4:
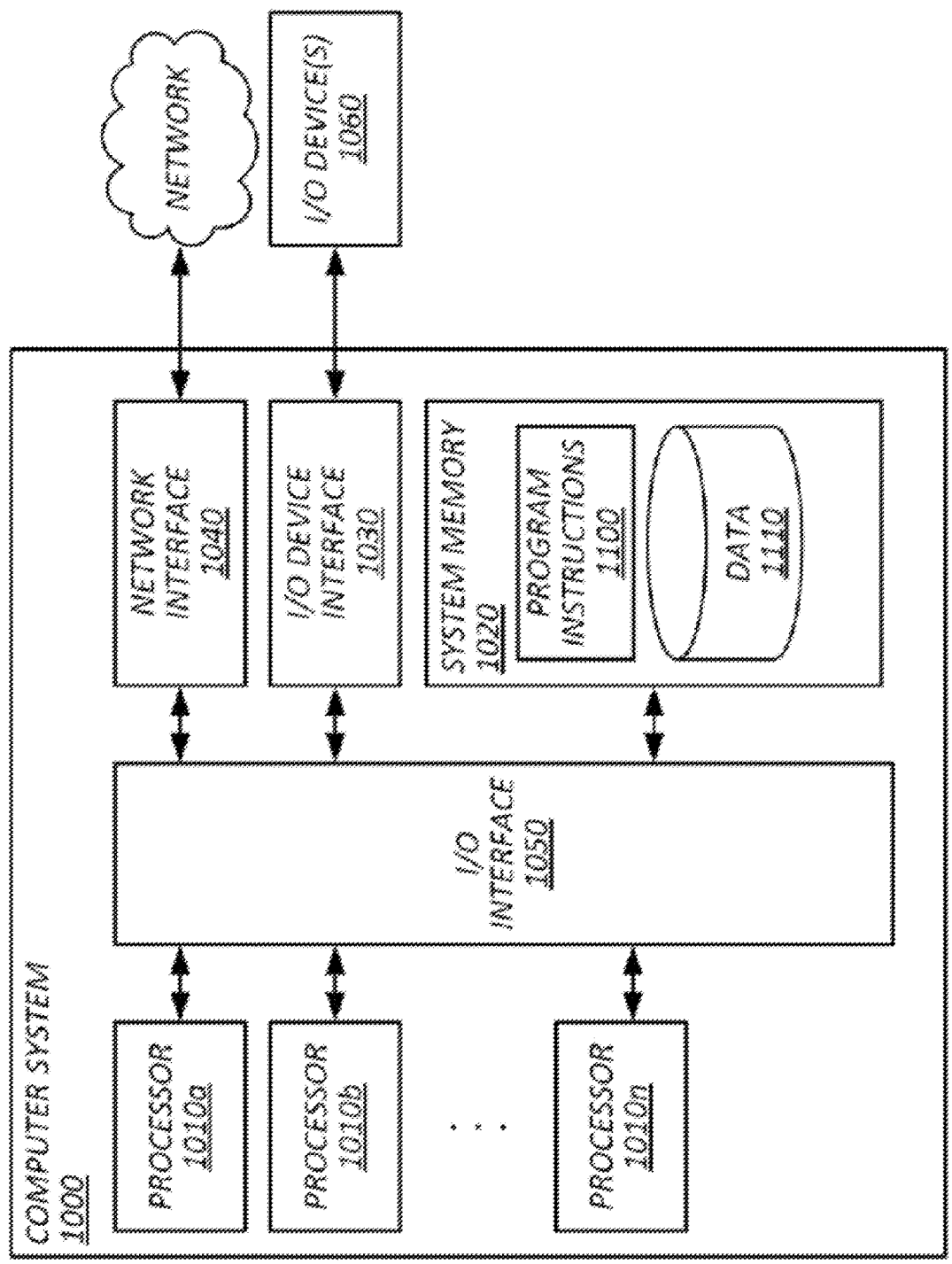
FIG. 4 illustrates an example of a computing device upon which the present techniques may be implemented.

FIG. 4 is a diagram that illustrates an example computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000. For example, the computing system 1000, components thereof, or a collection of computing systems, may be operable to perform one or more operations and/or included in one or more entities to perform those functions. For example, computing systems like computing system 1000 may be utilized to store and process data, like that described with reference to and illustrated in FIGS. 1-3 and also described and illustrated in U.S. Provisional Application No. 62/850,221, which is incorporated by reference herein in its entirety, and the computing system 1000 and other computing systems may be organized in a decentralized architecture of a computing platform that includes a multitude of clients that interact with one or more servers, and those server may further interact with other servers to retrieve and store data and effectuate operations based on that data, and those operations may include causing another server or servers to effectuate some other operation. The different clients and servers may be computing devices or systems having one or more components similar to those illustrated for the example computing system 1000. For example, one or more VDF Server(s), Client(s), and Space Server(s) as described herein may include one or more components similar to those illustrated. Thus, one or more computing systems 1000 may be utilized to perform operations within a decentralized computing platform, like an untrusted decentralized computing platform for managing digital assets stored within an untrusted decentralized database using techniques disclosed herein. Moreover, the disclosed techniques may reduce compute loads within an untrusted decentralized computing platform, such as by implementing a combination of proof of space and VDFs that are far less computationally expensive than proof of work based systems while maintain high security values. Example elements of an example computing system are discussed in greater detail below.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein. Some techniques described herein may be structured to mitigate performance gains afforded by parallel processing such as by specifying that a next value to be determined is based on a value currently being determined and so on for a sequence of tasks. In other words, some techniques may be specifically structured to negate performance benefit gained through the addition of computational power for parallel computing by forcing sequential tasking, such as through the implementation of VDFs in accordance with the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a datacenter, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, where certain U.S. patents, U.S. patent applications, or other materials (e.g., articles) have been incorporated by reference, the text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

What is claimed is:

1. A decentralized computing platform comprising:
a space server configured to:
store a blockchain data structure, comprising a series of blocks;
allocate an amount of drive storage of the space server;
in response to accessing a challenge based on a prior block in the series of blocks, generate a proof-of-space based on the amount of drive storage;
create a new block based on the proof-of-space; and
output the new block to the decentralized computing platform; and
a verifiable delay function VDF servers configured to:
store the blockchain data structure;
execute a verifiable delay function based on the prior block in the series of blocks;
receive the new block;
finalize the new block based on an output of the verifiable delay function; and
extend the blockchain data structure with the new block.

2. The decentralized computing platform of claim 1, further comprising:
a set of space servers comprising the space server; and
the VDF server configured to receive the new block from the space server in the set of space servers.

3. The decentralized computing platform of claim 1, further comprising:
the set of VDF servers comprising the VDF server; and
the space server configured to output the new block to the VDF server in the set of VDF servers.

4. The decentralized computing platform of claim 1, comprising the space server configured to store the blockchain data structure comprising the series of blocks, each block in the series of blocks comprising a proof-of-space and a VDF output.

5. The decentralized computing platform of claim 4, comprising the space server further configured to calculate the challenge based on a prior VDF output of the prior block in the series of blocks.

6. The decentralized computing platform of claim 5, comprising the space server configured to calculate the challenge by hashing a signature generated over the prior VDF output of the prior block.

7. The decentralized computing platform of claim 4, comprising the VDF server configured to execute the verifiable delay function based on a hash of the prior block in the series of blocks.

8. The decentralized computing platform of claim 1, comprising the space server configured to store the blockchain data structure comprising:
the series of blocks; and
a series of data blocks, each data block in the series of data blocks:
associated with a block in the series of blocks via a cryptographic signature; and
comprising transaction records.

9. The decentralized computing platform of claim 8, further comprising a client device executing a wallet application, the wallet application configured to the transaction records in the series of data blocks.

10. The decentralized computing platform of claim 1, comprising the space server configured to create the new block based on the proof-of-space, the new block comprising a cryptographic signature based on a key pair associated with the space server.

11. A space server in a decentralized computing platform configured to:
store a blockchain data structure, comprising a series of blocks;
allocate an amount of drive storage of the space server;
in response to accessing a challenge based on a prior block in the series of blocks, generate a proof-of-space based on the amount of drive storage;
create a new block based on the proof-of-space; and
output the new block to the decentralized computing platform.

12. The space server of claim 11, further configured to create a new data block associated with the new block via a cryptographic signature based on a key pair of the space server.

13. The space server of claim 12, configured to:
store the blockchain data structure comprising:
the series of blocks; and
a series of data blocks; and
create the new data block comprising:
a hash of a prior data block in the series of data blocks; and
the cryptographic signature.

14. The space server of claim 12, configured to create the new data block comprising transaction records for a cryptocurrency.

15. The space server of claim 11, further configured to select the blockchain data structure for storage based on a weight of the blockchain data structure, the weight of the blockchain data structure based on a number of blocks in the series of blocks.

16. The space server of claim 11, configured to output the new block to a VDF server in a set of VDF servers of the decentralized computing platform.

17. A verifiable delay function VDF server in a decentralized computing platform:
store a blockchain data structure comprising a series of blocks;
execute a verifiable delay function based on a prior block in the series of blocks;
receive a new block created based on a proof-of-space;
finalize the new block based on an output of the verifiable delay function; and
extend the blockchain data structure with the new block.

18. The VDF server of claim 17, configured to execute the verifiable delay function by repeatedly squaring a binary quadratic form based on the prior block in the series of blocks.

19. The VDF server of claim 17, further configured to select the blockchain data structure for storage based on a weight of the blockchain data structure, the weight of the blockchain data structure based on a number of blocks in the series of blocks.

20. The VDF server of claim 17, configured to receive the new block from a space server in a set of space servers of the decentralized computing platform.

* * * * *